E. F. RUECKERT.
TAKE-UP FOR FLEXIBLE ELECTRIC CONDUCTORS.
APPLICATION FILED DEC. 17, 1914.
1,153,829. Patented Sept. 14, 1915.
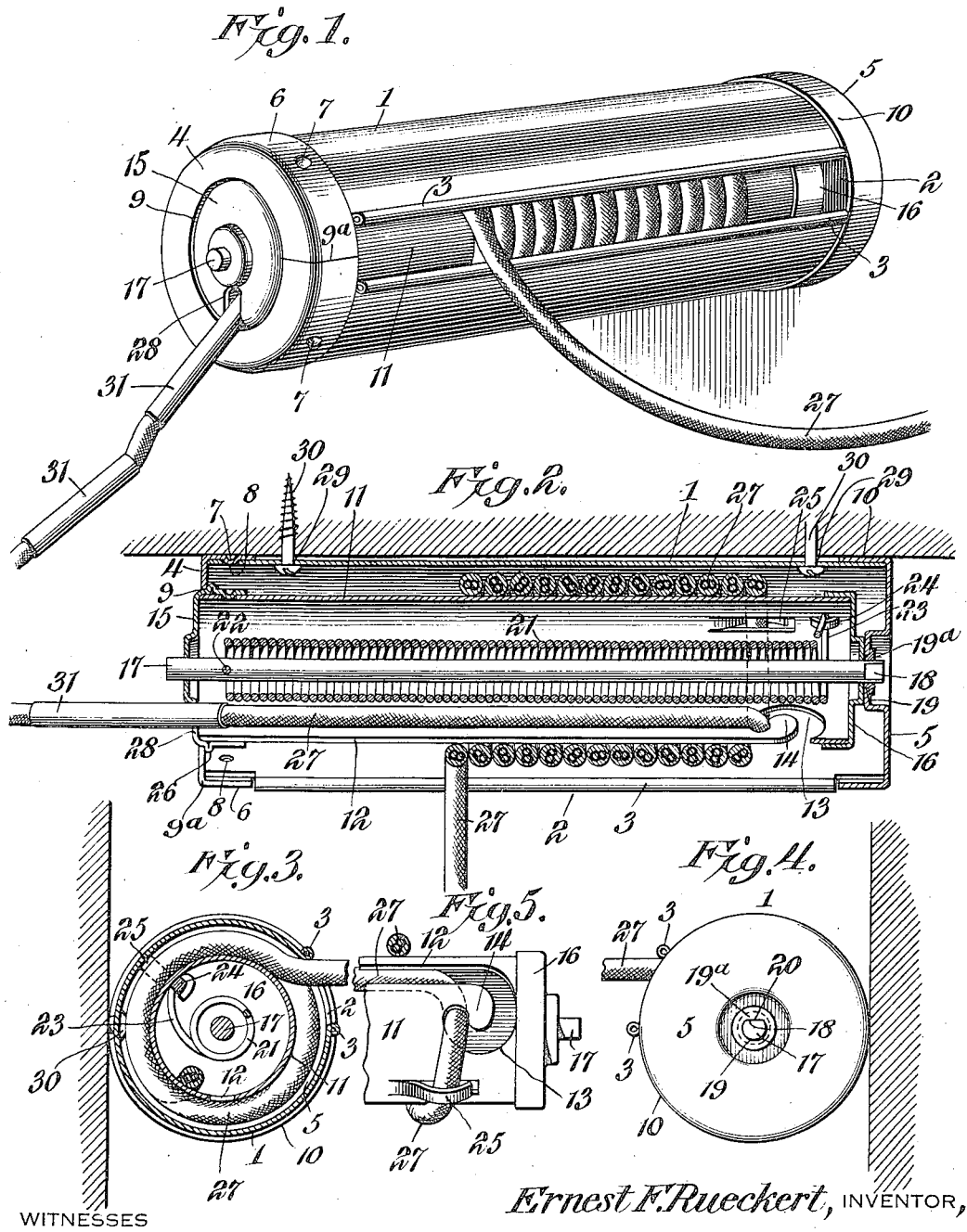
Ernest F. Rueckert, INVENTOR,
WITNESSES
BY
ATTORNEY

UNITED STATES PATENT OFFICE.

ERNEST F. RUECKERT, OF PROVIDENCE, RHODE ISLAND.

TAKE-UP FOR FLEXIBLE ELECTRIC CONDUCTORS.

1,153,829.

Specification of Letters Patent.

Patented Sept. 14, 1915.

Application filed December 17, 1914. Serial No. 877,768.

*To all whom it may concern:*

Be it known that I, ERNEST F. RUECKERT, a citizen of the United States, residing at Providence, in the county of Providence and State of Rhode Island, have invented a new and useful Take-Up for Flexible Electric Conductors, of which the following is a specification.

This invention has reference to take-ups for flexible electric conductors, and its object is to provide means whereby elongated flexible conductors are normally maintained within a minimum space, but are at all times freely extensible.

It is common to provide duplex flexible conductors for various purposes, whereby the device or apparatus fed by the conductors, or, as it is more commonly termed, the cord, may be moved from place to place, and sometimes the length of such a flexible conducting cord is considerable.

It is very common to provide telephone receivers with a flexible conducting cord several feet in length and again it is not uncommon to provide portable electric lamps with flexible conductors ten or fifteen or more feet in length. Such conductors frequently become tangled with various objects with which they come into contact, or they catch upon protruding parts and are frequently very much in the way. By the present invention there is provided a take-up reel for the cord having a constant tendency to wind the cord upon it, but offering so little resistance to the withdrawal of the cord from the reel as to make it quite possible to utilize the electrical device at any desired distance from the reel permitted by the length of the cord. By means of the present invention the cord is always in a more or less taut condition and hence does not form into loops and does not become caught upon or entangled with any projecting parts or any loose objects which may be in its neighborhood. Moreover, there is no liability of the cord, especially when of considerable length, coming in contact with the ground or floor where it is liable to become dirty or to be trod upon.

The present invention is constructed in a manner permitting its ready attachment to a telephone box or to the wall adjacent to the telephone or to any support adjacent to an electrical outlet from which an extension cord proceeds. Moreover, the present invention in its construction permits the application of the cord without any necessity of removing it from its installed position or of cutting the cord, or in any manner affecting or injuring the cord.

The invention will be best understood from a consideration of the following detailed description, taken in connection with the accompanying drawings forming a part of this specification, with the further unstanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is a perspective view of the reel or take-up for flexible conductors. Fig. 2 is a longitudinal diametric section through the reel. Fig. 3 is a cross-section. Fig. 4 is an end elevation. Fig. 5 is a fragmentary detail view of the winding reel removed from its casing and showing the cord engaging end thereof.

Referring to the drawings, there is shown a cylindrical casing 1 having a longitudinal mouth or opening 2. This casing may consist of a single sheet of metal rolled upon itself into cylindrical form with beaded longitudinal edges 3 in substantially parallel spaced relation, so that access to the interior of the casing is had throughout its length. Applied to the casing 1 are heads 4, 5, respectively, which heads may be spun or struck up from sheet metal. For purposes of ready access to the interior of the casing the head 4 is formed with a marginal axially extended flange 6 adapted to embrace the corresponding end of the casing 1, the beads 3 being appropriately shortened for the purpose. The flange 6 has indentations 7 therein and the casing 1 may have appropriate holes 8 into which the indentations readily snap to thereby lock the head in place. This head has a central opening 9 of appropriate size for a purpose to be described, and is radially split at 9$^a$.

The head 5 is provided with a marginal axially extended flange 10 embracing the corresponding end of the casing 1 and this head may be applied in a manner similar to the application of the head 4 or it may be fixedly attached to the casing, as by solder or otherwise, since it is not necessary that the head 5 be removed. Of course, it will be understood that either or both heads may be removable and in the case of one head being removable and the other fixed, it is not particularly material as to which shall be the fixed head and which shall be the removable head.

Adapted to the interior of the casing is a hollow reel 11 which like the casing 1 may be formed of sheet metal rolled into cylindrical shape with a longitudinal slot 12 throughout the greater portion of its length. This slot terminates at one end in a return bend 13 shaped at its closed end to form a tooth 14 for a purpose to be described. The reel or drum 11 is provided at the ends with heads 15, 16 closing these portions of the reel. Extending axially through the reel or drum 11 and journaled in the heads is a shaft 17 having one end provided with a flat 18 adapted to a central passage 19 in the head 5 of the casing, and this passage 19 has a bushing 19ª and a chord portion 20 adapted to the flat 18. By this means the shaft 17 when the drum 11 is installed in the casing 1 is held against rotation for a purpose which will presently appear. Surrounding the shaft 17 within the drum 11 is a spring 21 of appropriate size, and such a spring as is usually employed in shade rollers will answer for the purposes of the present invention. One end 22 of the spring 21 extends through an appropriate passage in the shaft 17, so that the spring is thereby locked to the shaft. The other end 23 of the spring is made fast to the interior of the drum 11 by a struck-in portion 24 of said drum, this struck-in portion constituting an eye. The wall of the drum 11 adjacent to the return end 13 of the slot 12 has a struck-up portion 25 forming an eye provided for a purpose which will presently appear. The head 15 is adapted to lodge in the opening 9 and may be provided with a retaining bead 26 or some other means may be provided for preventing longitudinal movement of the drum through the head 4 when the parts are assembled. There is also shown in the drawing a duplex flexible conductor 27 which may be considered as being constructed in the usual manner, and hence needs no description. Such a conductor is intended for coupling up some suitable electrical translating device with a source of current. This translating device may be a telephone receiver, or an electric lamp, or any device where it is desirable to employ a flexible conductor of considerable length, and which if unsupported between the outlet and the translating device is liable to be in the way.

Considering one end of the conductor 27 as made fast to an electric circuit in the usual way, as by means of an appropriate outlet, the head 4 may be removed from the casing 1, and then the reel or drum may be removed from said casing. The conductor 27 is now introduced into the reel through the slot 11 and projects through the head 15 of the reel by way of a suitable radial slot 28 therein, so that the conductor 27 may project through the passage 9 without interference from the head 4. The other end of the conductor is introduced into the return passage 13 and finally lodges behind the tongue 14 and adjacent to this passage 13 the conductor 27 is attached to the reel by means of the eye or tongue 25. Now the slack of the conductor beyond the eye 25 is wound upon the reel and the latter is introduced into the casing, so that the flattened end 18 of the shaft 17 projects through the passage 19 and is locked therein by the chord portion 20 of the passage 19. By imparting a suitable tension to the spring 21 before the flattened end 18 of the shaft 17 is lodged in the passage 19, the tendency of the spring to unwind will maintain the cord within the casing 1, and this cord will even be retained within the casing 1 without a preliminary winding of the spring, especially when it is desirable that a certain amount of the cord remain outside of the casing, as would be the case when the cord carries a telephone receiver.

In order that the casing 1 may be appropriately fixed to some support, it is pierced at the back by passages 29 for screws 30 accessible through the opening 2 when the reel or drum 11 is withdrawn. Other means for the purpose may be used. If, now, it be desired to extend the normally wound up portion of the flexible conductor or cord, the operator exerts upon the exposed end of the cord wound upon the drum 11 a sufficient force to overcome the spring 21, whereupon the cord issues from the casing through the mouth 2 thereof to the desired extent. The spring 21, however, maintains the cord in a correspondingly taut position and consequently there is no liability of entanglement of the cord with any objects, and annoyance caused by such entanglements are entirely avoided. When the operator is through with the electrical translating device it may be moved toward the winding structure until the cord is rewound to the desired extent upon the drum 11. While the cord 27 is most securely held on the reel it is not at all permanently attached thereto and may be disconnected from the reel at any time without any necessity of using tools, and the cord need not be cut or in any manner injured in its application or removal from the reel.

The structure of the present invention provides a convenient storage means for the cord where it is out of the way when not in use and where the cord is at all times protected from injury and the closure of the circuit by the production of a short circuit is practically out of the question.

While ordinarily the structure may be made of metal it may also be made of some material of a non-conducting nature, or the metal may be suitably insulated if such be desired, especially where the conductor is brought into contact with the metal. Instead of forming the casing and reel of sheet metal they may be made of metal tubing, and in order to protect the cord 27 from wear where extending through the slot 28 and from injury at other points, short metallic or other relatively stiff sleeves or tubes 31 are applied to the cord. The slit 9ᵃ permits the application of the head 4 to the cord without disturbing the cord or its connections.

What is claimed is:—

1. A take-up for flexible electric conductors, comprising a casing having a longitudinally extended outlet, and a winding reel within the casing with means constraining it to maintain a predetermined position and yieldable to a force tending to turn the reel upon its longitudinal axis, said reel being hollow and having a longitudinal slot for the passage of the flexible conductor, said slot terminating at one end of the reel in a portion extended toward the axis of the reel and said end of the reel being exposed at the corresponding end of the casing.

2. A take-up for flexible electric conductors, comprising a casing having a longitudinally extended outlet, and a winding reel within the casing with means constraining it to maintain a predetermined position and yieldable to a force tending to turn the reel upon its longitudinal axis, said reel being hollow and having a longitudinal slot for the passage of the flexible conductor, said slot terminating at one end of the reel in a portion extended toward the axis of the reel and said end of the reel being exposed at the corresponding end of the casing, that end of the longitudinal slot in the reel remote from the exposed end terminating in a portion returned upon the main portion of the slot and defining retaining means for the corresponding portion of the flexible conductor.

3. A take-up means for flexible electric conductors comprising an elongated casing having a longitudinally extended mouth or outlet, a reel or drum mounted within the casing for turning upon an axis longitudinal of the casing, said drum having a longitudinal slot therein terminating at one end of the reel in a portion extending toward the axis of the reel and at the other end in a portion returned upon and toward the main portion of the slot and defining a locking tongue for a flexible cord carried by the reel, and a spring in the reel or drum normally constraining said reel or drum to a predetermined position and yieldable to turning forces in one direction applied to the reel.

4. A take-up means for flexible electric conductors comprising a cylindrical casing with an elongated longitudinally disposed slot or mouth, heads for the casing with one head having a central non-circular opening therethrough and the other head provided with an enlarged central opening, and a drum having a central shaft extending axially therethrough with a spring surrounding the shaft and connected at the ends to the shaft and drum, respectively, said drum having a longitudinally extended slot in its walls terminating at one end of the drum in a radial extension directed toward the shaft and at the other end into a return portion defining a retaining tongue, said slot being adapted to receive a flexible conductor with a corresponding portion of the conductor lodged behind the tongue and another portion of the conductor within the radial portion of the slot, the shaft having a non-circular end adapted to engage the non-circular passage through the corresponding head of the casing and the drum also having one end adapted to the enlarged opening through the other head of the casing for exposure thereat, and said drum being further provided with a tongue adjacent to the first-named tongue for there retaining the flexible conductor.

5. A take-up means for flexible electric conductors comprising an elongated cylindrical casing with an elongated slot through one side opening at one end of the casing, a removable head for one end of the casing closing the corresponding end of the slot, and a reel or drum adapted to be mounted in the casing for turning movements therein, and of a size to permit a flexible electrical conductor to be wound thereon within the casing, said drum having one end adapted to the removable head and the latter having an opening therethrough of a size to expose the corresponding end of the drum, and said drum being provided with a longitudinal slot for the reception of a flexible conductor, the slot having a radial extension at one end toward the axis of rotation of the drum for the passage of the flexible conductor to the exterior of the casing and the other end of the slot in the drum being shaped to hold the flexible conductor against escape from the drum with the corresponding end of the conductor extending through the elongated mouth of the casing.

6. A take-up device for flexible electric conductors comprising a casing with an elongated outlet and a rotatable drum within the casing having an end exposed at the corresponding end of the casing, said drum being provided with a longitudinal slot through its walls with one end of the slot reaching to the exposed end of the drum and there extended toward the axis of rotation of the drum and exposed through the corresponding end of the casing, said slot being adapted for the passage of an intermediate portion of a flexible conductor with one end extended through the corresponding end of the casing and the other end extending through the elongated mouth or outlet portion of the casing.

7. A take-up device for flexible electrical conductors comprising a casing with a longitudinally extended mouth and with a removable head or closure at one end having a central opening, and a spring controlled drum within the casing adapted to receive a flexible electric conductor with one end extending through the mouth of the casing and one end of the drum being exposed at the corresponding end of the casing, said drum having a longitudinal slot with one end extended toward the axis of rotation of the drum and the other end formed into a retaining portion for the flexible conductor.

In testimony, that I claim the foregoing as my own, I have hereto affixed my signature in the presence of two witnesses.

ERNEST F. RUECKERT.

Witnesses:
GLADYS I. TYSON,
THEODORE C. RUECKERT.